United States Patent
Sexton

[11] Patent Number: 6,121,698
[45] Date of Patent: Sep. 19, 2000

[54] OIL COOLED MOTOR AND PUMP APPARATUS

[75] Inventor: James H Sexton, Lansing, Kans.

[73] Assignee: Fairbanks Morse Company, Kansas City, Kans.

[21] Appl. No.: 09/362,533

[22] Filed: Jul. 28, 1999

Related U.S. Application Data

[60] Provisional application No. 60/094,442, Jul. 28, 1998.

[51] Int. Cl.[7] .................................................. H02K 9/00
[52] U.S. Cl. .......................... 310/54; 310/52; 310/53; 310/54; 310/58; 310/62; 310/63; 310/64; 310/87; 310/89; 417/367; 417/368; 417/423.8
[58] Field of Search ................... 310/52, 53, 54, 310/57, 58, 59, 62, 63, 64, 87, 88, 89; 417/367, 368, 423.8, 423.14, 423.12

[56] References Cited

U.S. PATENT DOCUMENTS

| | | | |
|---|---|---|---|
| 2,829,286 | 4/1958 | Britz | 310/53 |
| 3,371,613 | 3/1968 | Dahlgren et al. | 103/87 |
| 3,525,001 | 8/1970 | Ericson | 310/54 |
| 3,653,785 | 4/1972 | Dahlgren et al. | 417/367 |
| 4,785,211 | 11/1988 | Erickson et al. | 310/57 |
| 4,890,988 | 1/1990 | Kramer et al. | 417/372 |
| 5,034,638 | 7/1991 | McCabria | 310/54 |
| 5,129,795 | 7/1992 | Hyland | 417/423.12 |
| 5,250,863 | 10/1993 | Brandt | 310/54 |
| 5,616,973 | 4/1997 | Khazanov et al. | 310/54 |

FOREIGN PATENT DOCUMENTS

| | | | |
|---|---|---|---|
| 0013869 | 8/1980 | European Pat. Off. | 29/58 |

OTHER PUBLICATIONS

International Search Report Mailed Dec. 3, 1999.

*Primary Examiner*—Nick Ponomarenko
*Assistant Examiner*—Than H Lam
*Attorney, Agent, or Firm*—Emerson & Associates; Roger D. Emerson; Timothy D. Bennett

[57] ABSTRACT

Disclosed is a motor and pump which operate completely submerged in the pump fluid which uses surrounding fluid to cool the heat generated within the motor. The motor is also built with the intention that it can run in non-submerged applications by placing a cooling jacket around the stator portion of the motor and passing a cooling fluid through the jacket to absorb the motor heat. The cooling system disclosed is such that it can be filled with a fluid circulated within the system but not in direct contact with the fluid being pumped within the pump. Preferably the cooling system includes a flow control tube for use in controlling the flow rate of the cooling liquid and an expansion tank for use in limiting the pressure of the cooling fluid in the cooling system.

11 Claims, 6 Drawing Sheets

| REF.NO | DESCRIPTION | MATERIAL | SPECIFICATION (1) |
|---|---|---|---|
| 4 | SHAFT, MOTOR | STAINLESS STEEL | A582 TYPE 416 |
| 4A | ROTOR | --- | --- |
| 4B | LOCKNUT | STEEL | COMMERCIAL |
| 4C | LOCKWASHER | STEEL | COMMERCIAL |
| 4F | RETAINING RING, INNER MECH SEAL | STEEL | COMMERCIAL |
| 4G | RETAINING RING, OUTER MECH SEAL | STEEL | COMMERCIAL |
| 31 | GLAND COVER | CAST IRON | A48 CL30 |
| 31A | CAPSCREW, GLAND SEAL | STAINLESS STEEL | AISI TYPE 316 |
| 31B | GLAND SEAL | RUBBER | BUNA-N |
| 32 | COVER, CABLE ASSEMBLY | --- | --- |
| 32A | O-RING, COVER | RUBBER | VITON |
| 32B | CAPSCREWS, COVER | STAINLESS STEEL | AISI TYPE 316 |
| 34 | LOWER BEARING HOUSING | CAST IRON | A48 CL30 |
| 34D | MOISTURE DETECTORS | --- | COMMERCIAL |
| 34E | RESISTOR | --- | --- |
| 34G | DRAIN PLUG | STAINLESS STEEL | 18-8 |
| 39 | CIRCULATOR, IMPELLER | BRASS | B584 C83600 |
| 39A | RETAINING RING | STEEL | COMMERCIAL |
| 71 | OIL JACKET | CAST IRON | A48 CL30 |
| 71B | O-RING, UPPER JACKET | RUBBER | VITON |
| 71C | O-RING, LOWER JACKET | RUBBER | VITON |
| 71D | STAND TUBE | STAINLESS STEEL | AISI TYPE 316 |
| 71E | RETAINER, JACKET | STAINLESS STEEL | AISI TYPE 316 |
| 71F | CAPSCREW, JACKET | STAINLESS STEEL | AISI TYPE 316 |
| 71G | ACCUMULATOR ASSEMBLY | --- | --- |
| 71H | VENT ASSEMBLY | | |

FIG-2A

| | | | |
|---|---|---|---|
| 75 | MOTOR HOUSING, TOP | CAST IRON | A48 CL30 |
| 75A | CAPSCREWS, TOP HOUSING | STAINLESS STEEL | AISI TYPE 316 |
| 75B | BAIL, LIFTING | STAINLESS STEEL | AISI TYPE 316 OR 17-4PH |
| 75C | CAPSCREWS, BAIL | STAINLESS STEEL | AISI TYPE 316 |
| 90 | MOTOR HOUSING | CAST IRON | A48 CL30 |
| 90A | STATOR | --- | --- |
| 90C | O-RING, HOUSING | RUBBER | VITON |
| 90D | CAPSCREW, HOUSING | STAINLESS STEEL | AISI TYPE 316 |
| 90E | GROUND SCREW | COMMERCIAL | --- |
| 90F | TERMINAL BOARD ASSEMBLY | --- | --- |
| 90H | LEADS, MOISTURE DETECTOR | POLYOLEFIN | COMMERCIAL |
| 90J | INSULATOR, SHRINK TUBE | RUBBER | BUNA-N |
| 90K | O-RING, TERM BOARD | COMMERCIAL | COMMERCIAL |
| 90L | RETAINING RING, TERM BOARD | STEEL | COMMERCIAL |
| 159 | COVER, LOWER BEARING | CAST IRON | A48 CL30 |
| 159A | CAPSCREW, LOWER BEARING COVER | STAINLESS STEEL | AISI TYPE 316 |
| 163 | BEARING, RADIAL | STEEL | COMMERCIAL |
| 168 | BEARING, THRUST | STEEL | COMMERCIAL |
| 202 | COVER, HANDHOLE | CAST IRON | A48 CL30 |
| 202A | O-RING, HANDHOLE COVER | RUBBER | VITON |
| 202B | CAPSCREW, HANDHOLE COVER | STAINLESS STEEL | AISI TYPE 316 |
| 456A | INNER MECHANICAL SEAL | --- | --- |
| 456B | OUTER MECHANICAL SEAL | | |

NOTES:
1. ALL MATERIAL SPECIFICATIONS ARE ASTM UNLESS OTHERWISE NOTED AND ARE FOR DESCRIPTION OF CHEMISTRY ONLY.
2. OPTIONAL MECHANICAL SEAL MATERIALS ARE AVAILABLE.

FIG-2B

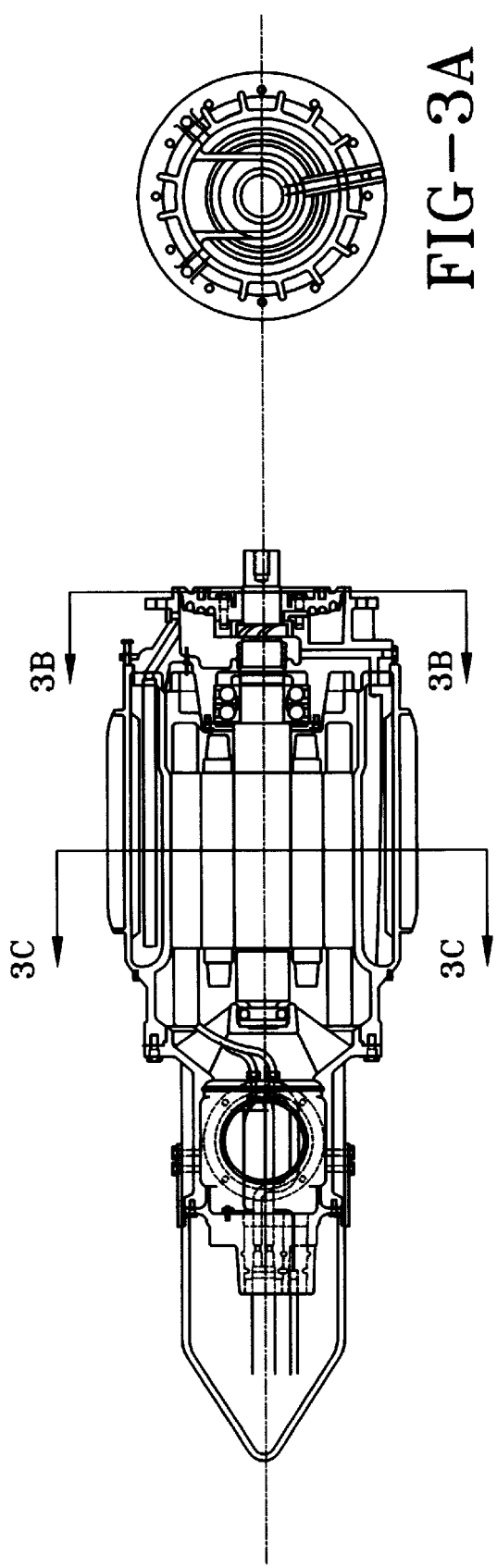
FIG-3A
FIG-3
FIG-3B
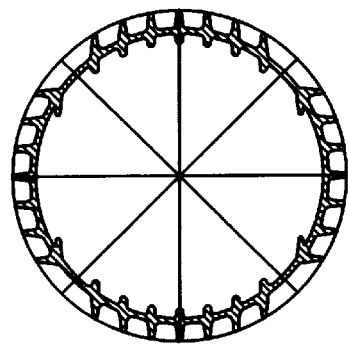
FIG-3C

OIL COOLED MOTOR AND PUMP APPARATUS

This utility patent application claims priority from provisional patent application Ser. No. 60/094,442, filed Jul. 28, 1998.

BACKGROUND OF THE INVENTION

I. Field of the Invention

This invention relates to an electric motors and more particularly to a method of cooling an electric motor used to drive a pump.

II. Description of the Related Art

Centrifugal pumps have large motors that require effective cooling to prevent overheating. Cooling systems known within the art use a motor coolant which circulates inside the motor housing in contact with components of the motor. Previous motors also contain a separate oil cooling system to pull heat directly away from the motor's housing. Typically, cooling oil is circulated within and through the motor. Heat exchangers are often used within circulating the cooling fluid.

One problem known in the art relates to the efficiency of cooling the oil used to cool the motor. One known method circulates cooling oil across a plate but does not fully segregate the oil prior to this. Thus the cooling oil is not cooled to the maximum degree of efficiency. What is needed is a system that fully separates the cooling oil thereby maximizing the heat transfer and thus the cooling of the cooling fluid.

Another problem related to known systems relates to the control of the flow of the cooling fluid. In particular, the cooling fluid flow rate is not controlled in any manner. Thus again the efficiency of the heat transfer process is not optimized. What is needed is a method of controlling the flow rate thereby fully controlling the heat transfer of the cooling fluid thereby better controlling the temperature control of the motor.

Another problem known in the art relates the physical characteristic of the cooling fluid. In particular, it is known that cooling fluids as they pick up heat from the motor they are cooling tend to expand. This expansion raises the pressure of the cooling fluid and if excessive can become dangerous. What is needed is a method that allows the cooling fluid to expand as necessary without increasing the pressure of the cooling fluid.

The present invention contemplates a new and improved oil cooled motor and pump apparatus which is simple in design, effective in use, and overcomes the foregoing difficulties and others while providing better and more advantageous overall results.

SUMMARY OF THE INVENTION

According to one aspect of the invention a motor that includes a motor housing, a motor shaft and a cooling system. The motor housing includes a main motor housing section, a lower housing section having first and second sides and a cooling plate that also has first and second sides. The first side of the lower housing section and the main motor housing section define a motor chamber that houses a motor assembly. The lower housing section also includes a first circulation port. The first side of the cooling plate and the second side of the lower housing section together form a circulation chamber. The first circulation port communicates with the circulation chamber. The motor shaft has a first end that is rotated by the motor assembly and a second end extends out of the motor housing and the cooling plate where it can be attached to a device such as a pump. The cooling system is used to cool the motor assembly and includes a cooling fluid, a cooling jacket that covers at least a portion of the main motor housing section and circulating means for circulating the cooling fluid through the cooling system.

According to another aspect of the present invention the motor may also include a flow control tube for use in controlling the flow rate of the cooling liquid through the cooling jacket.

According to still another aspect of this present invention the cooling system may also include an expansion tank that permits cooling fluid to expand into the expansion tank as the cooling fluid increases in temperature. In this way the pressure of the cooling fluid within the cooling system is limited.

One advantage of this invention is that the efficiency of the cooling system is improved over known systems because a separate circulation chamber is formed within the housing.

Another advantage of the present invention is that a flow controlled tube permits the controlling of the flow rate of the cooling liquid through the cooling system.

Another advantage of the present invention is that the cooling fluid is permitted to expand as necessary into an expansion tank thereby limiting the pressure of the cooling fluid.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangement of parts. A preferred embodiment of these parts will be described in detail in the specification and illustrated in the accompanying drawings, which form a part of this disclosure and wherein:

FIG. 2 is a listing of the description of parts with respect to FIG. 1 and FIG. 1A;

FIG. 3 is a sectional view of the motor associated with the present invention showing three cross-sections of the motor;

DESCRIPTION OF THE PREFERRED EMBODIMENT

Figure 4:
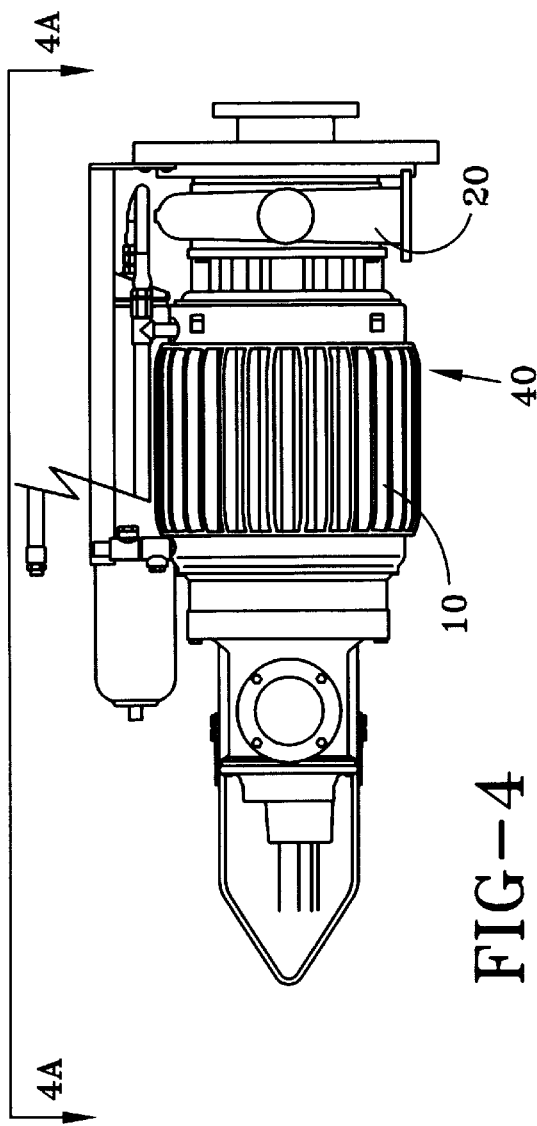
FIG. 4 is a side view showing the motor and pump of the present invention.

Referring now to the drawings, which are for purposes of illustrating a preferred embodiment of the invention only, and not for purposes of limiting the invention, FIG. 4 shows a motor 10 attached to a pump 20. In this preferred embodiment the pump is a non-clog pump used to pump sewage. However, it should be noted that the motor 10 of this invention can be used to drive or rotate any device chosen with sound engineering judgement. Although known sewage pumps including the one illustrated can be completely submerged within the fluid being pumped this particular embodiment has been invented for use in non-submerged applications. The motor 10 is kept cool using a cooling system 40.

Figures 1, 1A:
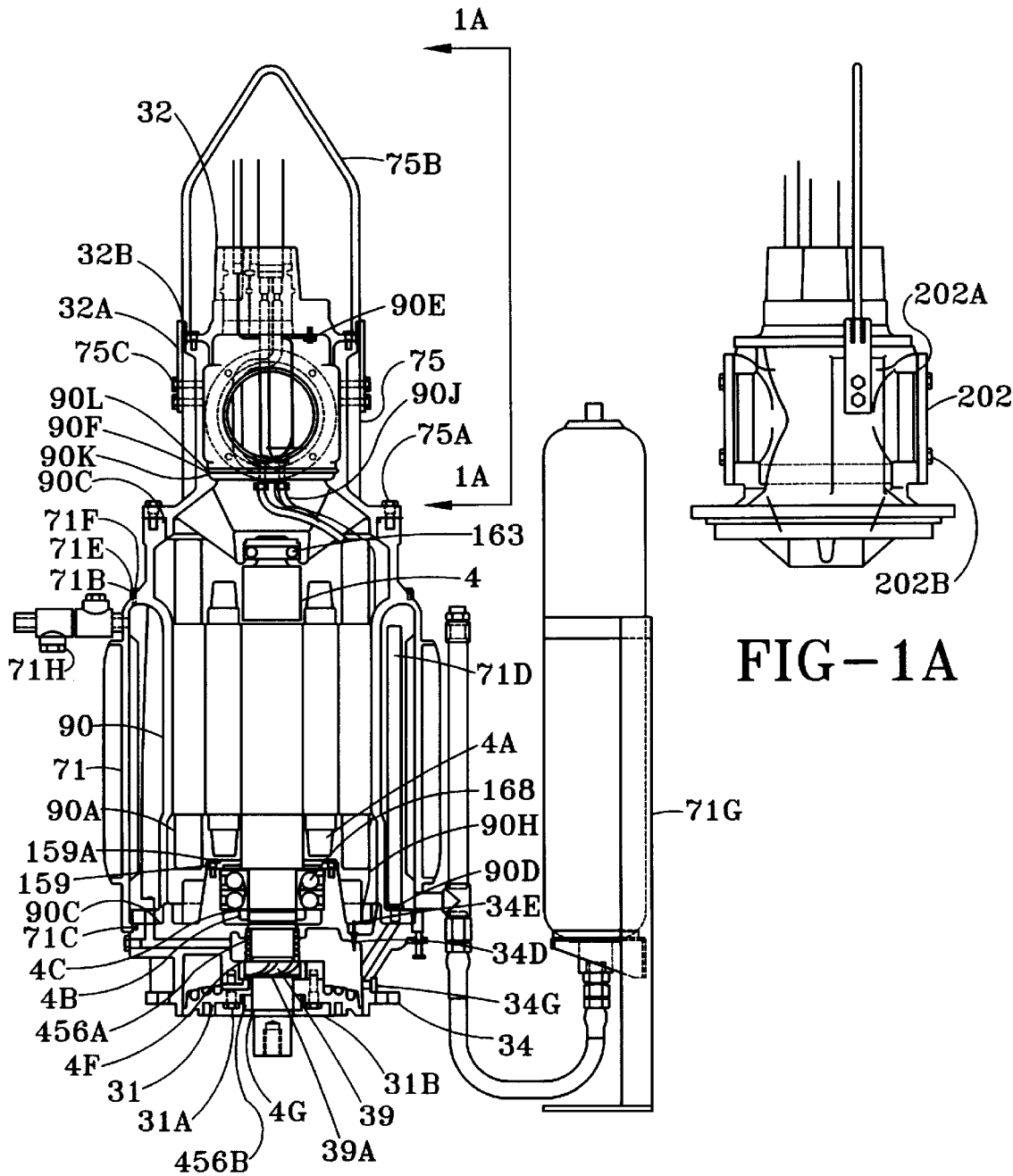
FIG. 1 shows a cross-sectional view of the mower and cooling system of this invention.
FIG. 1A is a view taken along line 1A—1A of FIG. 1.
Figure 5:
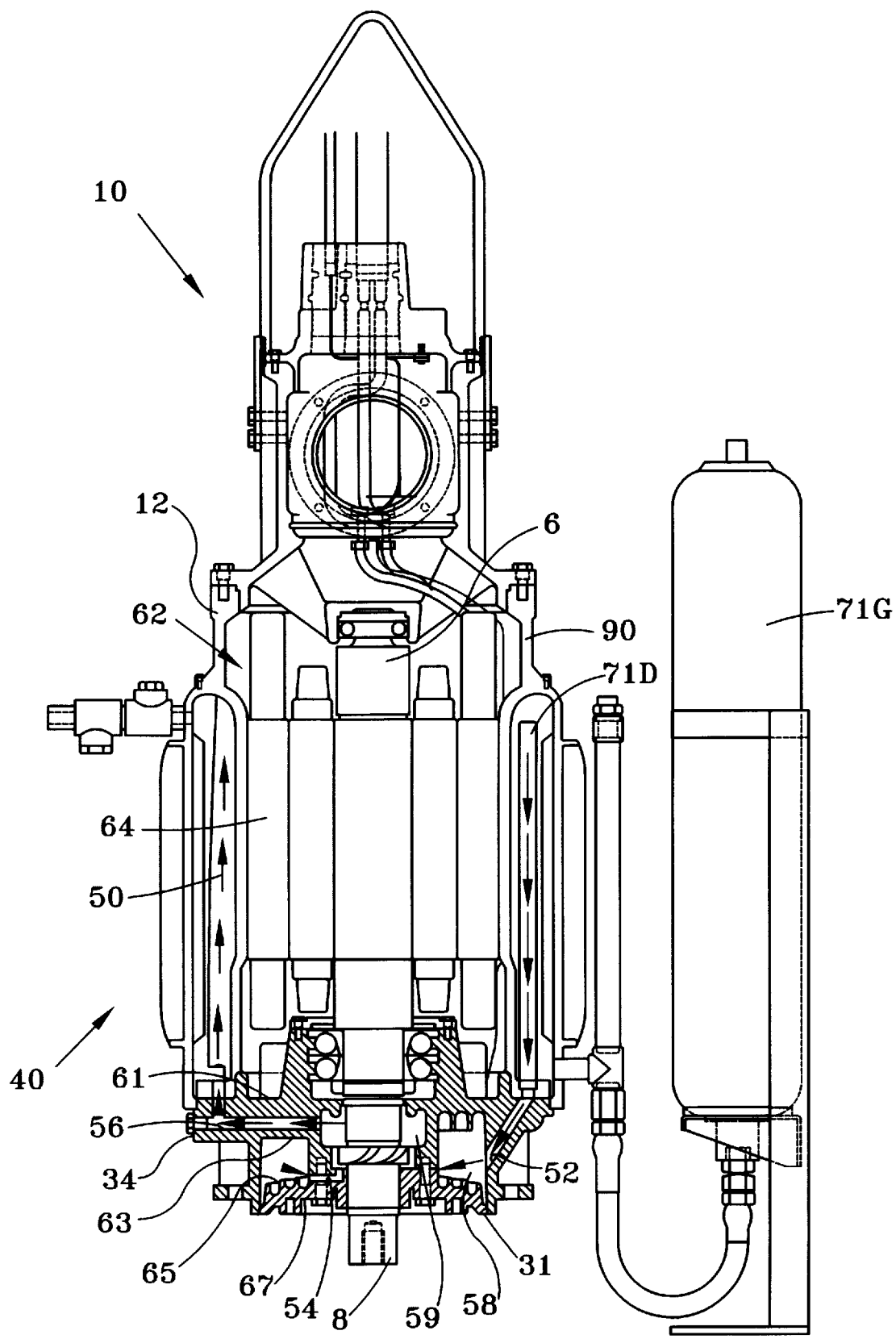

With reference now to FIGS. 1 and 5, the motor 10 includes a motor housing 12, a motor shaft 4, and the cooling system 40. Although the particular motor housing can be chosen with sound engineering judgements in protecting a motor, in this preferred embodiment the motor housing 12 includes a main motor housing section 90, a lower housing section 34, and a cooling plate 31. It is most preferred that the motor housing 12 also includes an upper housing section 75. Although the various housing sections are shown as separate pieces it is to be understood that the motor housing could include a single or perhaps two separate pieces. In the preferred embodiment, however, each housing section disclosed above is a separate piece attached to the other pieces as shown using cap screws as shown and listed in FIG. 2.

With continuing reference to FIGS. 1 and 5, the lower housing section 34 has first and second sides 61, 63. The first side 61 and the main motor housing section 90 define a motor chamber 62 for housing a motor assembly 64. The motor assembly 64 may include all required motor components such as in this preferred embodiment a rotor for A and a stator 90A. It should be noted that the lower housing section 34 has first, second, and third circulation ports 52, 54, and 56. The first circulation port is used to transport cooling fluid 50 (direction of flow shown using arrows in FIG. 5) into a circulation chamber 58. This circulation chamber 58 is formed within the second side 63 of the lower housing section and a first side 65 of a cooling plate 31. Thus as shown the first circulation port 52 has first and second ends formed on the first and second sides 61, 63 of the lower housing section 34.

Still referring to FIGS. 1 and 2, the second circulation port 54 is used to transfer the cooling fluid 50 from the circulation chamber 58 into an impeller chamber 59. As shown mounted to the motor shaft 4 is a circulating impeller 39 that provides circulating means for the cooling fluid 50. It should be understood of course that other circulating means could be used to circulate the cooling fluid. The impeller chamber 59 creates a zone for the cooling fluid 50 to be drawn into the circulating impeller 39 and thereafter forced forward into the cooling system 40. The third circulation port 56 communicates the impeller chamber 59 with a later to be described jacket 71.

Figure 4A:
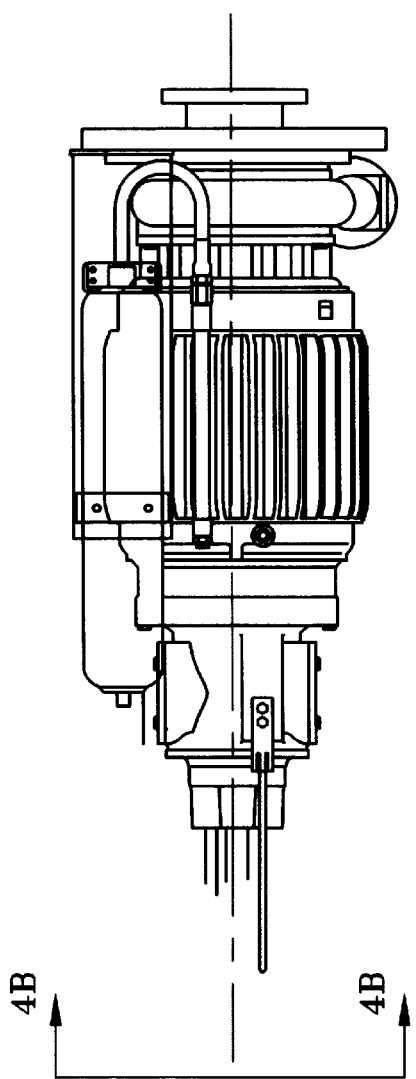
FIG. 4A is a view taken along the line 4A—4A of FIG. 4.
Figure 4B:
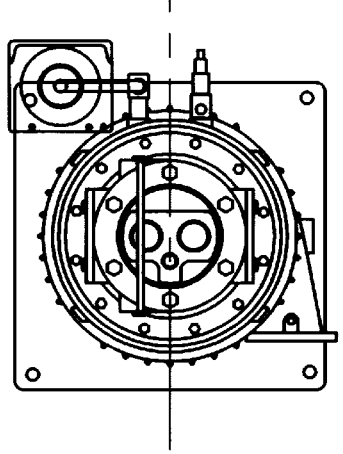
FIG. 4B is a view taken along the line 4B—4B of FIG. 4A; and, FIG. 5 is a sectional view showing the fluid flow schematics of the present invention.

With continuing reference to FIGS. 1 and 5, the motor 10 also includes a motor shaft 4 having a first end 6 that is operatively connected to the motor assembly 62 and a second end 8 that extends out of the main motor housing section 90 out of the lower housing section 34 and out of the cooling plate 31. The second end 8 of the motor shaft 4 is adapted to be connected to any associated device chosen with sound engineering judgement. In the preferred embodiment disclosed, the device is pump 20 shown in FIGS. 4 and 4A. It should be noted that radial bearings 163 are provided at the first end 6 of the motor shaft while thrust bearings 168 are shown near the second end 8 of the motor shaft 4 thereby providing for smooth and efficient rotation of the motor shaft 4. It should also be noted that the lower housing section 34 preferably provides a bearing housing for holding the thrust bearing 168 as shown.

Still referring to FIGS. 1 and 5, the cooling system 40 of this invention includes the previously mentioned cooling fluid 50 and a cooling jacket 71 that covers at least a portion of the main motor housing section 90. It is most preferred that the cooling jacket 71 cover or surround as much of the main motor housing section 90 as possible to increase the amount of heat transferred away from the motor assembly 64 held within the motor chamber 62. The cooling system 40 also includes circulating means as noted before and which is preferably the circulating impeller 39. The circulating means is then used to circulate the cooling fluid 50 throughout the cooling system 40 including through the cooling jacket 71. In order to properly control the rate of flow of the cooling fluid the cooling system 40 of this preferred embodiment also includes a flow control tube 71D. This flow control tube 71D is sized in accordance with the particular use intended for the motor 10 to apply the appropriate flow for the cooling fluid. Although a control tube 71D is preferred it should be understood that other means of controlling the flow are also here contemplated such as a needle valve for an orifice. The cooling system 40 of this invention also preferably includes an expansion tank 71G. This expansion tank provides room for the cooling fluid 50 to expand as it increases in temperature while taking the heat from the motor assembly 64. Thus the expansion tank 71G provides not only a space for the cooling fluid 50 to expand but also limits the pressure of the cooling fluid 50 throughout the cooling system 40. The particular size for the expansion tank 71G can be sized depending on the size of the motor 10 and thus the cooling system 40.

With reference now to FIGS. 1–5, the operation of the cooling system 40 of this invention will now be described. First the circulator impeller 39 draws the cooling fluid 50 from the circulating chamber 50 up through the second circulation port 54. The circulating impeller 39 then forces the cooling fluid 50 through the third circulation port 56 and on into the cooling jacket 71. As noted above, the cooling jacket 71 wraps around main motor housing section 90 so that the heat generated by the motor assembly 64 and transferred to the main motor housing section 90 can be removed by the cooling fluid 50. The cooling fluid 50 wants it exits the cooling jacket 71 is taken through the flow control tube 71D where the flow rate can be controlled (or throttled). If required the cooling fluid 50 can expand into the expansion tank 71G. Preferably the expansion tank 71G is attached to the cooling system 40 just prior to entry into the circulation chamber 58 as this is the location where the temperature of the cooling fluid 50 will be at its highest. Whether the fluid has expanded into the expansion tank 71G or not, it then proceeds through the first circulation port 52 and then into the circulation chamber 58 where the cooling fluid is cooled as it moves across the first side 65 of the cooling plate 31. It should be noted that it is necessary that some fluid be provided on the second side 67 of the cooling plate 31 thereby removing the heat from the cooling fluid 50. In this preferred embodiment where the motor 10 is used to drive pump 20, the fluid being pumped by pump 20 contacts the second side 67 of the cooling plate 31 and provides the heat transfer necessary to cool the cooling fluid 50. At this point the cooling fluid begins the cycle again and can be repeated as often as necessary whenever the motor 10 is being used.

The invention has been described with reference to the preferred embodiment. Obviously, modifications and alterations will occur to others upon a reading and understanding of the specification. It is intended by applicant to include all such modifications and alterations insofar as they come within the scope of the appended claims or the equivalents thereof.

What is claimed is:

1. A motor comprising:
   a motor housing that includes,
   A) a main motor housing section;
   B) a lower housing section having first and second sides, said first side of said lower housing section and said main motor housing section defining a motor chamber for housing a motor assembly, said lower housing section also having a first circulation port having first and second ends formed on said first and second sides of said lower housing section respectively;
   C) a cooling plate having first and second sides for use in transferring heat, said first side of said cooling plate and said second side of said lower housing section forming a circulation chamber, said first circulation port communicating with said circulation chamber;

a motor shaft having a first end that is operatively connected to said motor assembly and a second end that extends out of said main motor housing section, out of said lower housing section and out of said cooling plate, said second end of said motor shaft being adapted to be connected to an associated device; and, a cooling system for use in cooling said motor assembly that includes,
- A) a cooling fluid;
- B) a cooling jacket that covers at least a portion of said main motor housing section; and,
- C) circulating means for circulating said cooling fluid through said cooling jacket, said first circulation port, and said circulation chamber.

2. The motor of claim 1 wherein a circulating impeller operatively connects to said motor shaft thereby comprising said circulating means, said lower housing section further comprising:

an impeller chamber that houses said circulating impeller;

a second circulation port that communicates said circulation chamber with said impeller chamber;

a third circulation port that communicates said impeller chamber with said cooling jacket; and, wherein said circulating means also circulates said cooling fluid through said second and third circulation ports.

3. The motor of claim 2 wherein said cooling system further comprises:

a flow control tube for use in controlling the flow rate of said cooling liquid through said cooling jacket, said circulating means also circulating said cooling fluid through said flow control tube.

4. The motor of claim 3 wherein said cooling system further comprises:

an expansion tank for use in limiting the pressure of said cooling fluid.

5. The motor of claim 4 wherein said second end of said motor shaft is adapted to be connected to a pump that selectively pumps a pumping fluid that contacts said second side of said cooling plate for use in cooling said cooling fluid.

6. A motor comprising:

a motor housing that includes,
- A) a main motor housing section;
- B) a lower housing section having first and second sides, said first side of said lower housing section and said main motor housing section defining a motor chamber for housing a motor assembly; and,
- C) a cooling plate for use in transferring heat;

a motor shaft having a first end that is operatively connected to said motor assembly and a second end that extends out of said main motor housing section, out of said lower housing section, and out of said cooling plate, said second end of said motor shaft being adapted to be connected to an associated device; and, a cooling system for use in cooling said motor assembly that includes,
- A) a cooling fluid;
- B) a cooling jacket that covers at least a portion of said main motor housing section;
- C) fluid control means for controlling the flow of said cooling fluid through said cooling jacket; and,
- D) circulating means for circulating said cooling fluid through said cooling jacket, across said cooling plate and through said fluid control means.

7. The motor of claim 6 wherein said fluid control means is a flow control tube.

8. The motor of claim 6 wherein:

said lower housing section also includes a first circulation port having first and second ends formed on said first and second sides of said lower housing section respectively;

said cooling plate has first and second sides, said first side of said cooling plate and said second side of said lower housing section forming a circulation chamber, said first circulation port communicating with said circulation chamber; and, said circulating means also for circulating said cooling fluid through said first circulation port and through said circulation chamber.

9. The motor of claim 6 wherein said cooling system further comprises:

an expansion tank for use in providing space for said cooling fluid to expand.

10. A motor comprising:

a motor housing that includes,
- A) a main motor housing section;
- B) a lower housing section having first and second sides, said first side of said lower housing section and said main motor housing section defining a motor chamber for housing a motor assembly; and,
- C) a cooling plate for use in transferring heat;

a motor shaft having a first end that is operatively connected to said motor assembly and a second that extends out of said main motor housing section, out of said lower housing section, and out of said cooling plate, said second end of said motor shaft being adapted to be connected to an associated device; and, a cooling system for use in cooling said motor assembly that includes,
- A) a cooling fluid;
- B) a cooling jacket that covers at least a portion of said main motor housing section;
- C) an expansion tank for use in providing space for said cooling fluid to expand and for limiting pressure of said cooling fluid within said cooling system; and,
- D) circulating means for circulating said cooling fluid through said cooling jacket and across said cooling plate.

11. The motor of claim 10 wherein:

said lower housing section also includes a first circulation port having first and second ends formed on said first and second sides of said lower housing section respectively;

said cooling plate has first and second sides, said first side of said cooling plate and said second side of said lower housing section forming a circulation chamber, said first circulation port communicating with said circulation chamber; and, said circulating means also for circulating said cooling fluid through said first circulation port and through said circulation chamber.

* * * * *